United States Patent
Launay et al.

(10) Patent No.: US 7,110,614 B2
(45) Date of Patent: Sep. 19, 2006

(54) METHOD AND APPARATUS FOR RECONSTRUCTING AN IMAGE OF AN OBJECT

(75) Inventors: Laurent Launay, St. Remy les Chevreuse (FR); Andreas Rick, Schwerte (DE); Régis Vaillant, Villebon sur Yvette (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 592 days.

(21) Appl. No.: 10/284,572

(22) Filed: Oct. 30, 2002

(65) Prior Publication Data

US 2003/0123720 A1 Jul. 3, 2003

(30) Foreign Application Priority Data

Nov. 30, 2001 (FR) .................................. 01 15527

(51) Int. Cl.
*G06K 9/36* (2006.01)
(52) U.S. Cl. ..................... 382/280; 382/132; 378/23
(58) Field of Classification Search ............ 382/128, 382/129, 130, 131, 132, 133, 154, 168, 171, 382/172, 199, 203, 209, 218, 232, 243, 260, 382/274, 288–297; 375/240.16; 600/437, 600/427, 431, 426; 378/37, 23
See application file for complete search history.

(56) References Cited

U.S. PATENT DOCUMENTS 5,553,111 A * 9/1996 Moore et al. ............... 378/37
6,081,577 A * 6/2000 Webber ....................... 378/23
6,309,353 B1* 10/2001 Cheng et al. ............... 600/437
6,370,196 B1* 4/2002 Griessl et al. .......... 375/240.16
6,574,499 B1* 6/2003 Dines et al. ................ 600/427
6,721,590 B1* 4/2004 Ohishi et al. ............... 600/431
6,856,827 B1* 2/2005 Seeley et al. ............... 600/426

FOREIGN PATENT DOCUMENTS

FR 2733142 10/1996
WO 0032109 6/2000

OTHER PUBLICATIONS

Meyer et al, "Evaluation of Control Point Selection in Automatic Mutual Information Driven, 3D Warping", Medical Image Computing and Computer Assisted Intervention, MIC-CAI, International Conf, Proc. xx,xx, Oct. 11, 1998 pp. 944-951.
Maxview Positioning System, Planned Company.

* cited by examiner

*Primary Examiner*—Jingge Wu
*Assistant Examiner*—Seyed Azarian
(74) *Attorney, Agent, or Firm*—Cantor Colburn LLP

(57) ABSTRACT

A method and apparatus for reconstructing an image of an organ or body part from at least two images of the organ or body part taken using radiography in two positions of the organ or body part separated by a rolling movement of the organ or body part. The rolling movement of the organ or body part is determined between two positions, extracting motion vectors for the surface of the organ or body part, interpolating motion vectors between the motion vectors extracted, and reconstructing an image of the organ or body part. The method and apparatus allows the three-dimensional structure of the tissue to be reconstructed while reducing ambiguities due to the presence of a lesion overlaying the tissue.

21 Claims, 4 Drawing Sheets

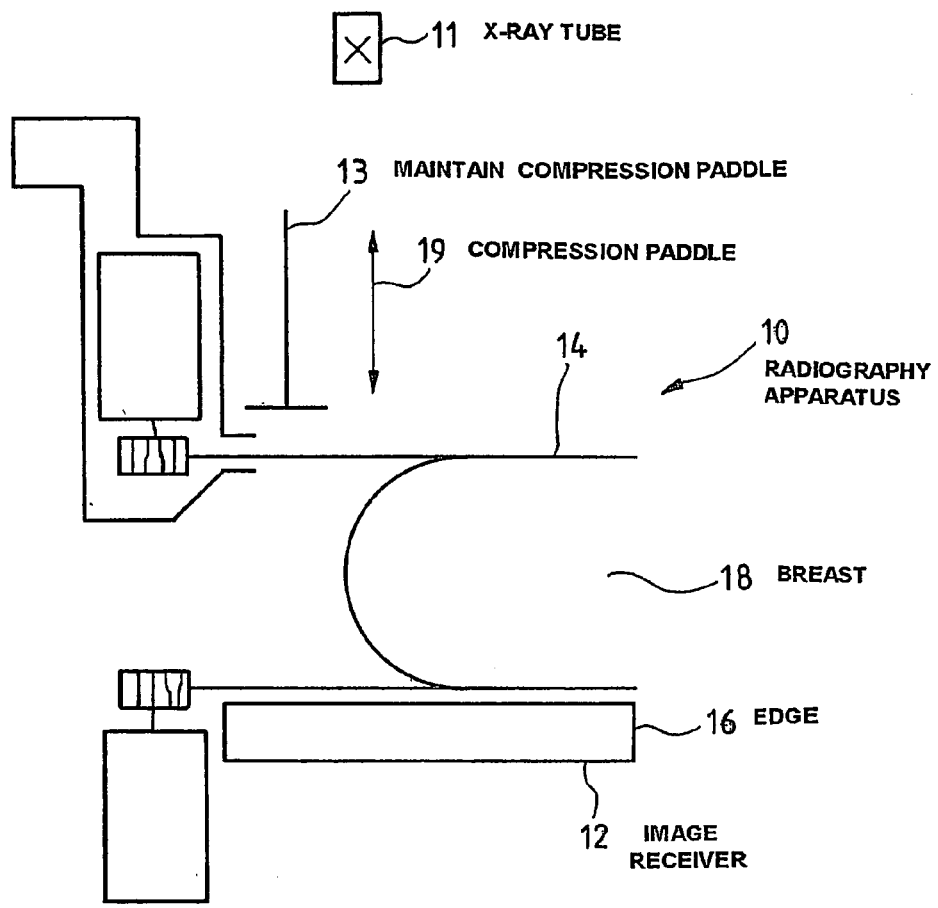
FIG_1
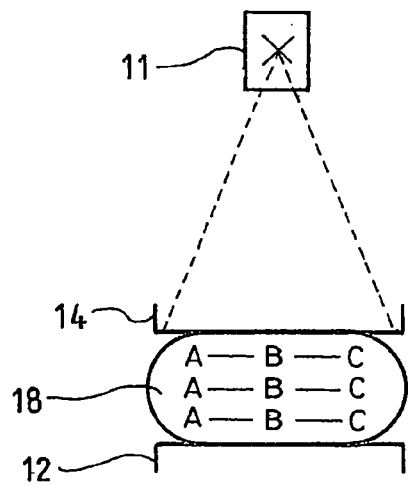
FIG_2

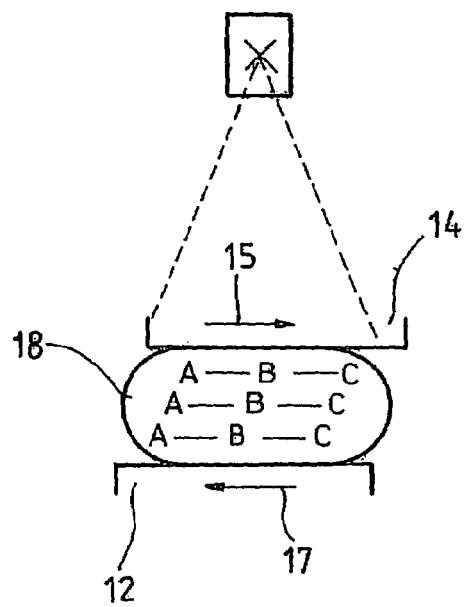
FIG_3
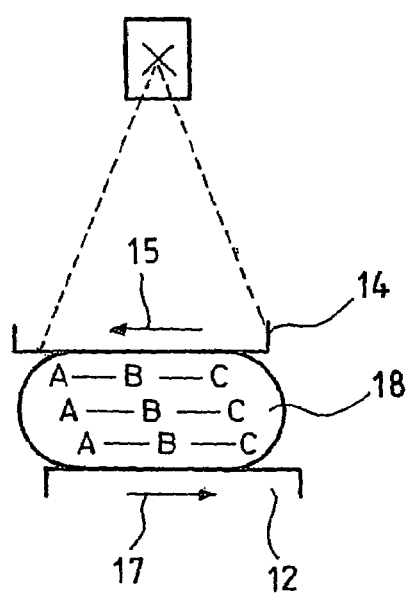
FIG_4

FIG_5
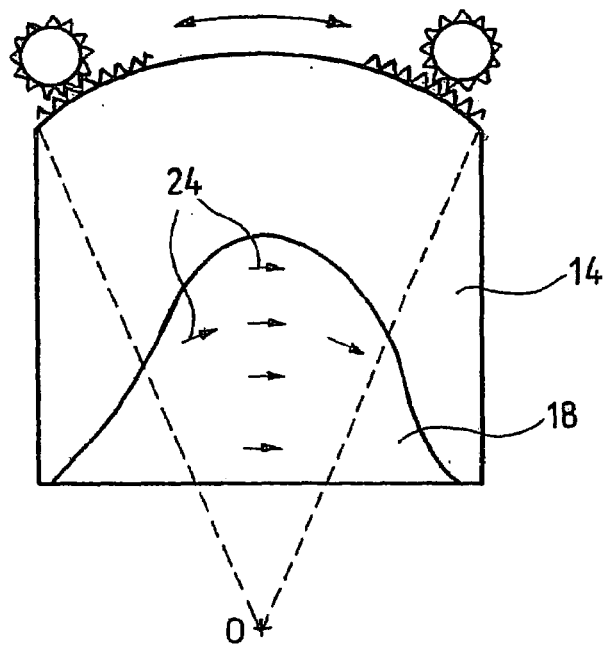
FIG_6
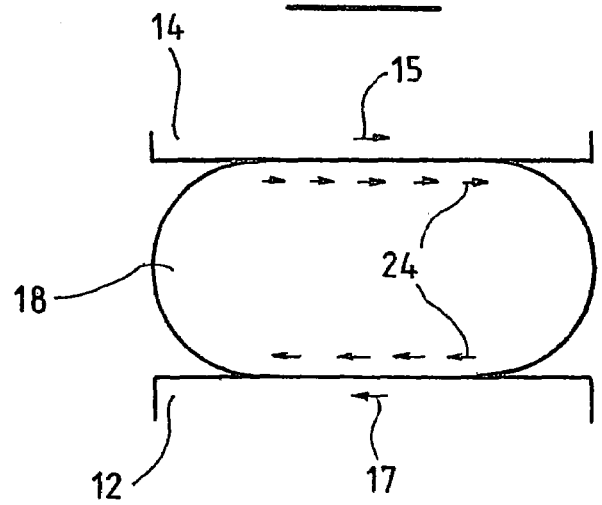

FIG_7
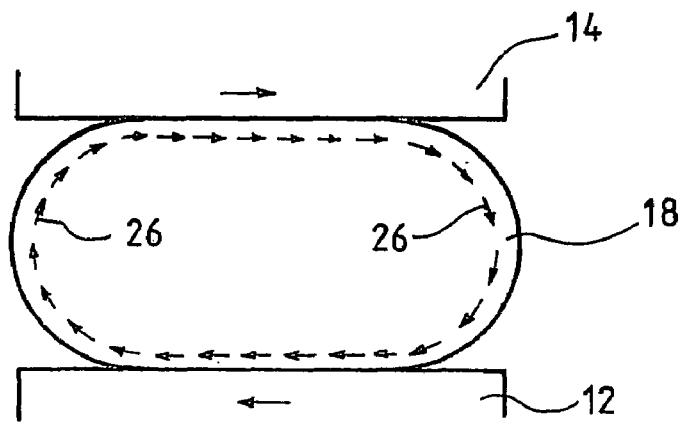
FIG_8
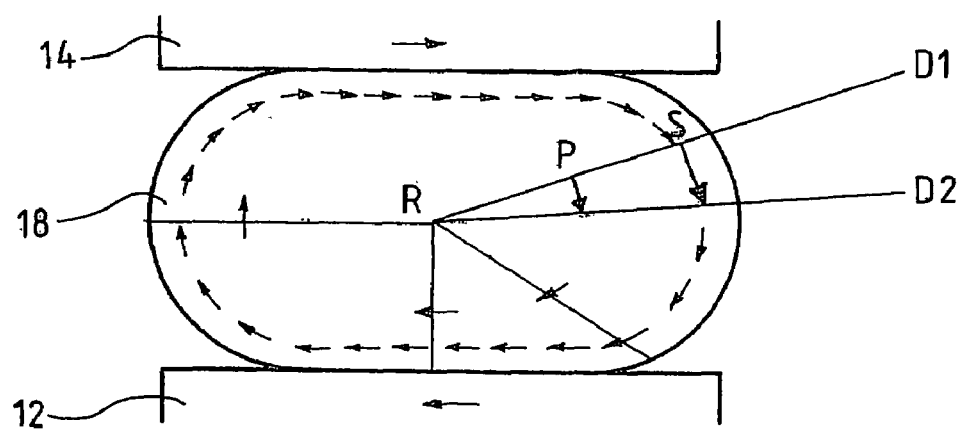

METHOD AND APPARATUS FOR RECONSTRUCTING AN IMAGE OF AN OBJECT

CROSS-REFERENCE TO RELATED APPLICATIONS

This application claims the benefit of a priority under 35 USC 119 to French Patent Application No. 01 15527 filed Nov. 30, 2001, the entire contents of which are hereby incorporated by reference.

BACKGROUND OF THE INVENTION

The invention relates to a method and apparatus for reconstructing an image of an object and, in particular, an organ or body part.

An apparatus and method for mammography apparatus enables the breasts of patients to be examined using X-rays. The image is acquired using an image receiver comprising either a photographic plate or digital sensing means. When taking images, the patient's breast is held against the image receiver by means of a compression paddle. The compression paddle presses the breast against a receiver, compressing it in the direction of propagation of the X-rays. Examinations practiced using such apparatus comprise taking cranio-caudal and lateral views. Cranio-caudal views are taken by irradiating the breast from above so as to obtain a view thereof in an axis extending from the patient's head to her/his feet. A side view is taken by irradiating the patient from the side so as to obtain a view of the breast in an axis passing through the patient's body.

In conventional mammography, the compression paddle is movable not only in a direction parallel to the direction of the X-rays, but also in a direction perpendicular to the X-ray propagation direction (for example in the Senographe of GE Medical Systems). This makes it possible to freely position the compression paddle prior to fixing it in its breast compression position. Once the paddle is in the compression position, the compression paddle remains stationary.

The Planmed company is proposing a compression system in its Maxview apparatus that comprises a compression paddle and an image receiver associated with a film that is movable in a direction perpendicular to the X-ray propagation direction and perpendicular to the rib cage. This apparatus allows the breast to be alternately compressed and stretched, optionally several times, prior to taking the image and/or between different images. This apparatus can take images of the major portion of the breast.

In the apparatus described above, when taking images, the three-dimensional arrangement of the patient's breast tissue is projected onto an image plane. When examining a dense breast or one that includes numerous fibrous structures, tissue superimposition when taking images is a source of ambiguity in their interpretation.

Images of parts of the body can also be obtained by the technique of tomography. Tomography makes it possible to obtain an X-ray of a thin slice of an organ or body part at a desired depth. In this method, a body part is fixed between an image receiver and a compression paddle, and the radiation source can be moved around the body part. When examining a dense breast or one with numerous fibrous structures, tissue overlay when imaging leads to ambiguities in interpreting the views obtained.

BRIEF DESCRIPTION OF THE INVENTION

In one embodiment of this invention, reconstructing an image of an object, such as an organ or body part, from at least two images of the object taken using radiographic apparatus in two positions of the object separated by a rolling movement of the object comprises:
  determining the rolling movement of the object between the two positions;
  extracting motion vectors for the surface of the object;
  interpolating motion vectors between the motion vectors extracted; and
  reconstructing an image of the object.

An embodiment of the method makes it possible to reconstruct a three-dimensional image of the structure of tissue while reducing ambiguities concerning the presence of a lesion, resulting from overlay of tissue.

An embodiment of an apparatus is described for carrying out the method.

BRIEF DESCRIPTION OF THE DRAWINGS

The invention will be described with respect to the following figures in which:

FIG. 1 is a diagrammatic side view of radiography apparatus;

FIGS. 2, 3 and 4 are side views of the apparatus in FIG. 1 for taking images in various positions of the object;

FIG. 5 is a diagrammatic view showing rolling of the compression paddle; and

FIGS. 6 to 8 are diagrammatic views of movements of the object.

DETAILED DESCRIPTION OF THE INVENTION

With reference to the drawings, a method and apparatus according to one embodiment of the invention is described. An embodiment of the invention provides a method and apparatus for reconstructing an image of an object, such as an organ or body part, from at least two radiographic images taken using radiography. The images are obtained in two positions of the object, such as an organ or body part and, in particular a breast 18, separated by a rolling movement thereof.

FIG. 1 is a diagrammatic side view showing a radiography apparatus 10. The apparatus 10 comprises means for emission of radiation, such as a tube 11 delivering X-rays; means for providing an image, such as image receiver 12; and means for compression, such as a compression paddle 14. Tube 11 delivers X-rays in a propagation direction. Image receiver 12 is adapted to receive a radiation from the tube 11. Image receiver 12 has an edge 16 for contact with the patient. Compression paddle 14 is between the tube 11 and image receiver 12. The paddle can be moved up and down parallel to the direction of propagation of the X-rays, in a direction of arrow 19. The apparatus also comprises means 13 for maintaining compression paddle 14, along the direction of propagation of the radiation, in a compression position. In this compression position, compression paddle 14 is movable in projection in at least one direction perpendicular to the X-ray propagation direction, and parallel to the contact edge 16 of image receiver 12. In one embodiment, image receiver 12 is also movable in projection in at least one direction perpendicular to the X-ray propagation direction, and parallel to contact edge 16.

The apparatus in FIG. 1 allows an object 18 to be compressed between receiver 12 and the compression paddle 14, and the object to be rolled to take images thereof in two positions, separated by the rolling movement. The apparatus has the advantage of taking different views, while the X-ray tube is immobile and the patient does not change position. On the various images obtained, the object body part thickness remains identical.

FIGS. 2, 3, 4 are diagrammatic side views of images being taken in various object body part positions.

FIG. 2 shows images of object body part 18 in the compression position between image receiver 12 and compression paddle 14. The image is taken before rolling. This gives an image in which the positions of tissue identified by A, B and C overlay each other.

FIG. 3 shows the taking of an image in which image receiver 12 and compression paddle 14 have undergone a rolling movement, respectively to the left in a direction of arrows 17, and to the right in the direction of arrow 15. As a result of this rolling movement, object body part tissue is deformed and the positions of the tissue identified by A, B and C are modified when the image is taken.

FIG. 4 shows imaging in which image receiver 12 and compression paddle 14 have undergone a rolling movement, respectively to the right (arrow 17) and to the left (arrow 15). In the images obtained, the positions A, B and C have been modified differently to the modifications in the preceding images.

FIGS. 2, 3 and 4 show, in a non-limiting embodiment, rolling of image receiver 12 and compression paddle 14. Simply rolling the compression paddle is also possible. The advantage of rolling both receiver 12 and compression paddle 14 is that the position of all tissue is modified, in particular the positions of tissue close to image receiver 12. Taking more than two images, one after the other, and performing a rolling movement between each image is also possible. It is also possible, between each image after rolling, to return to the position in which receiver 12 and compression paddle 14 are not rolled.

The method for reconstructing an image of an object body part is performed starting from at least two radiographic images of the body part taken with a radiographic apparatus of which apparatus 10 is an example. The two images correspond to two positions of the object body part separated by a rolling movement thereof. The image that forms the reference image is freely determined. The two images can be, for example, obtained as in FIGS. 2 and 3, or 2 and 4, or 3 and 4 . . . . The method includes the determination of the rolling movement of the object body part between the two positions. This makes it possible to know the amount of movement of image receiver 12 and compression paddle 14 performed between each image. Image receiver 12 and compression paddle 14 can be shifted manually. It is however advantageous to obtain the movement using a motor which allows control of the movement. Position sensors or markers that are visible on the images can also measure the rolling movement.

The method comprises the extraction of motion vectors for rolling of the object body part between the two positions. This step is illustrated on FIG. 5. FIG. 5 is a diagrammatic view of the rolling of compression paddle 14. FIG. 5 is a cranio-caudal view of the object body part below compression paddle 14. The arrows 24 represent these vectors. The motion vectors are extracted for those points on the surface of the object body part that remain in contact with receiver 12 and compression paddle 14 during rolling. FIG. 6 shows diagrammatically the movements of the object body part in a side view. The arrows 24 show the motion vectors for points that remain in contact with compression paddle 14 and image receiver 12. The motion vectors for these points correspond to the amount by which compression paddle 14 and image receiver 12 have moved. In FIG. 5, compression paddle 14 has a circular motion centered at 0. Locally, the amount of movement of the compression paddle is equal to the amount of movement of a point on the surface of the object body part that remains in contact with compression paddle 14 or image receiver 12.

The image reconstruction comprises interpolation of motion vectors for the inside of the object, i.e., organ or body part, between the extracted vectors, for determining the movement of the complete object between the compression paddle and image receiver. The method comprises the step of image reconstruction of the object, i.e., organ or body part. The method provides a three-dimensional image reconstruction thereof, allowing more reliable information to be obtained regarding possible lesions and a better differentiation between lesions and healthy tissue.

The reconstructed images of the object, i.e., organ or body part, are displayed using known display techniques such as the MIP (maximum intensity pixel), VR (volume rendering) techniques.

Between the extraction and interpolation steps, the method comprises a step, as shown in FIG. 7, in which motion vectors are extrapolated for the body part surface, between the extracted vectors. This part of the surface corresponds to the natural contours of the body part. Motion vectors show the amount of movement of points on the surface of the object body part that are not in contact either with receiver 12 or with compression paddle 14. This step allows motion vectors for a whole surface of the object body part to be defined.

The interpolation step comprises interpolating motion vectors for points located inside the object body part.

In an embodiment, the interpolation and/or extrapolation steps(s) are performed using an elastic model of the body part. This model can comprise three-dimensional elements that locally modify the mechanical properties (elasticity and visco-elasticity) of the object body part. The three-dimensional elements simulate, for example, a lesion. The properties that are locally different are defined before radiography is performed (for example, while supposing the properties of the object, e.g., an organ, except for the lesion, remain constant). The mechanical stresses defined by the compression of compression paddle 14, and by the rolling movement of compression paddle 14 and image receiver 12, are applied to the model as limiting conditions. This model allows the motion vectors for the whole object body part to be determined.

In an embodiment, interpolation and/or extrapolation step(s) are performed using a method based on the supposition that a reference point R at the center of the object body part exists, and that tissue deformation is substantially symmetrical about this point R. The point R is for example the natural center of the object body part when it is not rolled, or the point midway between compression paddle 14 and image receiver 12, as shown in FIG. 8. Determination of the motion vector for a point P located inside the object body part is performed as follows. The point R is determined. A straight line D1 is drawn between this reference point and the point P. The straight line D1 makes it possible to determine the point S on the object body part's surface for which the motion vector is proportional to that of point P. Straight line D1 passes through the origin of the motion vector for point S. A straight line D2 is drawn between point R and the end of the motion vector for point S. The motion vector for point P is the one with its origin at point P, which extends parallel to the motion vector for point S and which has its end on straight line D2. The motion vectors for points P and S are proportional, and the ratio between the two vectors corresponds to the ratio of their respective distance with respect to point R.

The extrapolation and interpolation steps can be performed using another method similar to the preceding one, by determining a reference segment at the center of the object body part, instead of a reference point.

The motion vector field is identified by Di below.

The three-dimensional image reconstruction of the object body part is performed using an iterative algebraic reconstruction technique (ART) type algorithm. Nevertheless, the method can be generalized to any iterative algorithm or comprising the operations of forward and back projection. Image reconstruction of the object body part is for example performed as follows:

initialization of a dataset concerning the object body part by using existing information such as information on the object body part, the pressure exercised by compression paddle 14 or a typical attenuation (X-ray absorption capacity) of the object body part tissue;

pre-processing of the sequences of images acquired (for example for gain correction, conversion to thickness images);

iterative reconstruction: each image Pi of projection can be interpreted as a linear combination of a voxel (volume element) attenuation V(x, y, z). The geometry of the projection method can be defined by a matrix Hi defining the assignment of voxel attenuation to each pixel (i representing the image index):

$$Pi = Hi * V$$

The projection matrix Hi can be decomposed into a conical projection matrix Hci and deformation matrix Di. As conical projection matrix Hci does not change during acquisition (the apparatus is not moving), the images from projections can be simplified:

$$Pi = H\ Di\ V$$

The dataset for the volume is initialized to V(0) using the existing prior information discussed above. Iterative reconstruction (k=iteration number) is as follows:

for each cycle;
for each projection image;
update current volume V(k) to V(k+1) as follows:
apply 3D deformation Di to volume V(k)

$$Vi(k) = Di\ V(k)$$

projection of dataset Vi(k) onto the current image by applying $$Pi(k) = Hi\ Vi(k);$$

estimation of the residual image between Pi(k) and the acquired image Ii $$Ei(k) = Pi(k) - Ii$$

back projection of the normalized residual image (N being a normalization coefficient and $\lambda$ the relaxation coefficient) onto the volume, using $Vi(k+1) = Vi(k) + \lambda^T Hi\ Ei(k)/N$ inversion of the 3D deformation matrix to estimate V(k+1)

$$V(k+1) = Di^{-1} Vi(k)$$

until a limiting criterion is reached.

The three-dimensional image reconstruction method makes it possible to reconstruct a volume in three dimensions starting from images of the object, i.e., organ or body part, that is rolled between images. The choice of images and, in particular, the first image that supplies the reference shape for reconstruction, is left to the practitioner's choice. This method makes it possible to obtain views of the object, i.e., organ or body part, for angles for which images have not been taken.

Radiography may be preceded by a step during which the patient manually displaces receiver 12 and compression paddle 14 to the compression position. This step makes it possible to define the limiting movements for image receiver 12 and compression paddle 14 beyond which movement would cause pain to the patient. During radiography, the movements that precede imaging are performed between these limiting movements.

The object body part the image of which is reconstructed is for example a female or male patient's breast.

One skilled in the art may make various modifications in structure and/or steps and/or function and/or way and/or manner and equivalents thereof without departing from the scope and extent of the invention as recited in the claims.

What is claimed is:

1. A method for reconstructing an image of an object from at least two images of the object using radiography in two positions of the object separated by a rolling movement of the object, wherein the radiography comprises an X-ray tube, means for providing the image and means for compression, the method comprising:
   compressing the object between the means for providing an image and the means for compression;
   determining the rolling movement of the object between the two positions;
   extracting motion vectors for the surface of the object;
   interpolating motion vectors between the motion vectors extracted; and
   reconstructing the image of the object.

2. The method according to claim 1 wherein the interpolation comprises interpolating motion vectors for the inside of the object.

3. The method according to claim 1 wherein between the extraction and interpolation, the method comprises extrapolating motion vectors for the surface of the object between the vectors extracted.

4. The method according to claim 1 wherein between the extraction and interpolation, the method comprises extrapolating motion vectors for the surface of the object between the vectors extracted.

5. The method according to claim 2 wherein the extrapolation and/or interpolation are performed with a model of the object.

6. The method according to claim 3 wherein the extrapolation and/or interpolation are performed with a model of the object.

7. The method according to claim 5 wherein the interpolation and/or extrapolation is based on a reference point at substantially the center of the object.

8. The method according to claim 5 wherein the interpolation and/or extrapolation is based on a reference segment at substantially the center of the object.

9. The method according to claim 1 wherein the relative translatory movement of the rolling movement is in opposite directions.

10. The method according to claim 1 wherein the relative translatory movement of the rolling movement is of the means for compression.

11. The method according to claim 1 wherein when taking more than two images, the rolling movement is performed between each image.

12. The method according to claim 1 wherein between each image after the rolling movement, the means for providing an image and the means for compression are returned to an initial position.

13. An apparatus comprising:
means for providing a source of X-ray radiation;
means for compressing an object to be radiated;
means for providing an image of the object after being radiated;
means for moving the means for compression and/or the means for providing an image in a direction perpendicular to the propagation direction of the radiation, the means for moving causing a rolling movement of the object by a relative translatory movement of the means for providing an image and the means for compression; and
means for extraction of motion vectors for at least two positions of the object.

14. The apparatus according to claim 13 wherein the means for providing an image of the object takes two images separated by a rolling movement of the object.

15. The apparatus according to claim 14 comprising:
means for determining the rolling movement of the object between the two positions;
means for interpolating motion vectors between the extracted motion vectors; and
means for reconstructing the image of the object.

16. The apparatus according to claim 15 wherein the interpolation comprises:
interpolating motion vectors for the inside of the object.

17. The apparatus according to claim 15 wherein between the extraction and interpolation, comprising extrapolating motion vectors for the surface of the object between the vectors extracted.

18. The apparatus according to claim 17 wherein the extrapolation and/or interpolation are performed with a model of the object.

19. The apparatus according to claim 13 wherein the means for compression and/or the means for providing an image are moved in opposite directions.

20. The apparatus according to claim 13 wherein the perpendicular movement is of the means for compression.

21. The apparatus according to claim 13 wherein between each acquired image after the movement, the means for providing an image and the means for compression are returned to an initial position.

* * * * *